United States Patent
Williams

(10) Patent No.: US 9,821,496 B2
(45) Date of Patent: Nov. 21, 2017

(54) METHOD OF FORMING ONE OR MORE FLANGES ON OR IN A HOLLOW CONTINUOUSLY WOUND STRUCTURAL MEMBER

(71) Applicant: Camplas Technology Limited, Bridgend (GB)

(72) Inventor: Anthony Carey Williams, Nr. Bridgend (GB)

(73) Assignee: Camplas Technology Limited, Bridgend (GB)

( * ) Notice: Subject to any disclaimer, the term of this patent is extended or adjusted under 35 U.S.C. 154(b) by 749 days.

(21) Appl. No.: 14/355,746

(22) PCT Filed: Oct. 31, 2012

(86) PCT No.: PCT/GB2012/052715
§ 371 (c)(1),
(2) Date: May 1, 2014

(87) PCT Pub. No.: WO2013/064825
PCT Pub. Date: May 10, 2013

(65) Prior Publication Data
US 2014/0287171 A1    Sep. 25, 2014

(30) Foreign Application Priority Data

Nov. 1, 2011   (GB) .................................. 1118853.9
May 23, 2012   (GB) .................................. 1209203.7

(51) Int. Cl.
*B29C 57/00*    (2006.01)
*B29C 41/42*    (2006.01)
(Continued)

(52) U.S. Cl.
CPC .............. *B29C 41/02* (2013.01); *B29C 41/42* (2013.01); *B29C 53/585* (2013.01); *B29C 53/62* (2013.01);
(Continued)

(58) Field of Classification Search
CPC ......... B29C 41/02; B29C 41/42; B29C 57/00; B29C 53/62; B29C 53/585; B29C 53/824; Y10T 428/1314; B29L 2031/766
See application file for complete search history.

(56) References Cited

U.S. PATENT DOCUMENTS 3,052,585 A    9/1962  Anderson
3,331,907 A    7/1967  Salzinger
(Continued)

FOREIGN PATENT DOCUMENTS

DE    1188270    3/1965
DE    10349385   6/2005
(Continued)

*Primary Examiner* — Brent W Herring
(74) *Attorney, Agent, or Firm* — Simpson & Simpson, PLLC

(57) ABSTRACT

A method of and apparatus for forming one or more flanges or formations, which may conveniently be inwardly facing, on or in a hollow continuously wound structural member, such as a hollow pole, the method including the steps of providing a tapered mandrel on which to continuously wind a loop of filament or filaments to form a hollow structural member, providing an end-forming plate at at least one end of the mandrel, placing one or more formers on the outside of the mandrel adjacent to and spaced from the or each end plate by a required amount to form one or more flanges when the member has been fully wound and set within a resin, and subsequently removing the continuously wound structural member from the mandrel.

5 Claims, 4 Drawing Sheets

(51) Int. Cl.
  *B29C 41/02*  (2006.01)
  *B29C 53/58*  (2006.01)
  *B29C 53/82*  (2006.01)
  *B29C 53/62*  (2006.01)
  *B29L 31/00*  (2006.01)

(52) U.S. Cl.
  CPC ............ *B29C 53/824* (2013.01); *B29C 57/00* (2013.01); *B29L 2031/766* (2013.01); *Y10T 428/1314* (2015.01)

(56) References Cited

U.S. PATENT DOCUMENTS

| | | | | |
|---|---|---|---|---|
| 3,477,891 A * | 11/1969 | Hawerkamp | ......... | B29C 53/581 |
| | | | | 138/144 |
| 3,651,560 A * | 3/1972 | Phillips | ................ | B29C 53/585 |
| | | | | 156/175 |
| 3,970,495 A * | 7/1976 | Ashton | .................. | B29C 33/52 |
| | | | | 138/144 |
| 4,137,950 A | 2/1979 | Briscall | | |
| 5,428,896 A * | 7/1995 | Auberon | ................. | B29C 33/52 |
| | | | | 29/888.09 |
| 5,571,357 A | 11/1996 | Darrieux | | |
| 5,645,668 A | 7/1997 | Lin et al. | | |
| 5,795,524 A * | 8/1998 | Basso, Jr. | ............... | B29C 33/52 |
| | | | | 156/155 |
| 6,071,460 A * | 6/2000 | Renaudin | .............. | B29C 70/446 |
| | | | | 264/257 |
| 6,444,071 B1 * | 9/2002 | Ayorinde | .............. | B29C 53/822 |
| | | | | 156/155 |
| 7,815,141 B2 * | 10/2010 | Uozumi | .................. | B29C 53/602 |
| | | | | 242/438 |
| 8,720,153 B2 * | 5/2014 | Smith | ................... | B21C 37/124 |
| | | | | 29/428 |
| 9,387,632 B2 * | 7/2016 | Varin | .................... | B29C 70/462 |
| 2007/0125032 A1 * | 6/2007 | Guerrero | ............... | B29C 53/824 |
| | | | | 52/651.01 |
| 2009/0308477 A1 | 12/2009 | Geislinger et al. | | |
| 2010/0148408 A1 * | 6/2010 | Yen | ....................... | B29C 70/462 |
| | | | | 264/516 |
| 2014/0217652 A1 * | 8/2014 | Varin | .................... | B29C 70/462 |
| | | | | 264/571 |
| 2016/0167319 A1 * | 6/2016 | Sabo | ..................... | E21B 17/042 |
| | | | | 156/172 |

FOREIGN PATENT DOCUMENTS

| | | |
|---|---|---|
| GB | 1371337 | 10/1974 |
| GB | 2460741 | 12/2009 |
| JP | 3222723 | 10/1991 |
| WO | 9820263 | 5/1998 |

* cited by examiner

METHOD OF FORMING ONE OR MORE FLANGES ON OR IN A HOLLOW CONTINUOUSLY WOUND STRUCTURAL MEMBER

CROSS-REFERENCE TO RELATED APPLICATIONS

The present application is the national stage application pursuant to 35 U.S.C. §371 of International Patent Application No. PCT/GB2012/052715, filed Oct. 31, 2012, which claims priority from United Kingdom Patent Application No. 1118853.9, filed Nov. 1, 2011, and from United Kingdom Patent Application No. 1209203.7, filed May 23, 2012, which applications are incorporated herein by reference in their entireties.

FIELD OF THE INVENTION

This invention relates to hollow members, such as structural support holes, made from filaments, such as glass fibre, or bunches of filaments, made by being formed on a tapered mandrel by continuous winding along and about the mandrel, the filaments being embedded in a suitable binder, such as polyester resin.

BACKGROUND OF THE INVENTION

A known advantage of making structural members such as hollow tapered poles from filament-wound glass fibre reinforced plastic (GRP) is that the filaments can be orientated generally along the length of the structural member to thus impart stiffness and hence provide an optimum strength to weight ratio. It is also well known that optimum strength occurs when the filaments remain uncut or unbroken hut, in practice, it is necessary to provide joints where the structural member has to be connected to other elements, such as being fixed to the ground or by attaching fixing joints to the structural member above the ground by which other elements can be attached to it. This is very difficult to achieve without cutting or drilling into the GRP and hence the mechanical advantage of maintaining continuously round filaments under tension is lost at the points where they are cut for such purposes.

BRIEF SUMMARY OF THE INVENTION

The present invention is derived from the realisation that there is a need for filament wound structural members in or on which are formed flanged formations which provide fixing points by which e.g. the structural member, if a hollow pole, may be secured to the ground at one end and to which another element or elements may be affixed whilst maintaining a continuity of all or most of the filaments so that they remain wound and in tension thereafter, to thereby maximise the strength of the structural member.

According to a first aspect of the invention there is provided a method of forming one or more flanges or formations, which may conveniently be inwardly facing, on or in a hollow continuously wound structural member, such as a hollow pole, the method including the steps of providing a tapered mandrel on which to continuously wind a loop of filament or filaments to form a hollow structural member, providing an end-forming plate at at least one end of the mandrel, placing one or more formers on the outside of the mandrel adjacent to but spaced from the or each end plate by a required amount to form one or more flanges when the member has been fully wound and set within a resin, and subsequently removing the continuously wound structural member from the mandrel.

Conveniently, the or each flange or formation is inwardly facing, such as radially inwardly facing, at one or both ends of the structural member, although it will be understood that other flanges or formations of different shape may be formed at intermediate points along the length of the structural member, each being shaped by the presence of a corresponding former thereunder or thereabout.

Preferably, the or each former is removed from the inside of the structural member once the latter has been removed from the mandrel, by the use of a segmented former or formers allowing each such segment to be removed sequentially. Alternatively, the or each former may be elastomeric in nature or otherwise bendable, being strong enough to allow the formation of a flanged or otherwise formed region but pliant enough to be removed from the inside of the structural member upon completion of the fabrication process. Further alternatively, the former may instead be left in position within the structural member, particularly if the former is itself hollow, thereby enabling it to be used in conjunction with the or each flange or formation for the purposes of attaching the structural member to another element, such as the ground, or to another structural element, such as a weight-bearing arm of an electricity pylon.

According to a second aspect of the invention there is provided a structural member made in accordance with the method according to the first aspect of the invention. In particular, the structural member may comprise a tubular post having continuously wound inwardly facing flanges at each end, by which the post may be secured to another element, such as the ground, at one end and to another element at its other end, such as a laterally extending support arm of e.g. a pylon for supporting electricity transmission cables.

According to a third aspect of the invention there is provided apparatus for making a support member in accordance with the second aspect of the invention which includes a tapered mandrel, at least one former adapted to fit against an outside surface of the mandrel adjacent to but spaced from an end-forming plate, and filament winding means for continuously winding filament over the length of the mandrel to the limit imposed by the presence of the or each end-forming plate including in the gap between the or each former and the or each end-forming plate to thereby form at least one flange or other formation in that region.

With the arrangements described with respect to the first, second and third aspects of the invention it is therefore possible to provide a continuously wound structural member with one or more inwardly facing flanges or other formations therefor without the need to, separately, attach flanges or other fixing elements to the structural member, which is therefore commensurately stronger than would otherwise be the case. In particular, to fix such a structural member to the ground it is instead simply necessary to either drill holes through the inwardly facing flange or formation at the largest-diameter end and thereafter bolt the structural member to the ground, causing relatively minimal damage to the continuity of the filament windings. However, it will also be understood that e.g. swan-neck metal fixing plates may be used instead to clamp the flanged or formed region to the ground without the need to drill holes or otherwise cut the filaments in this region. In a similar manner, if a flange has been formed at the other end of the structural member it can be used to attach it to some other fixture, such as the weight-bearing arm of a pylon.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
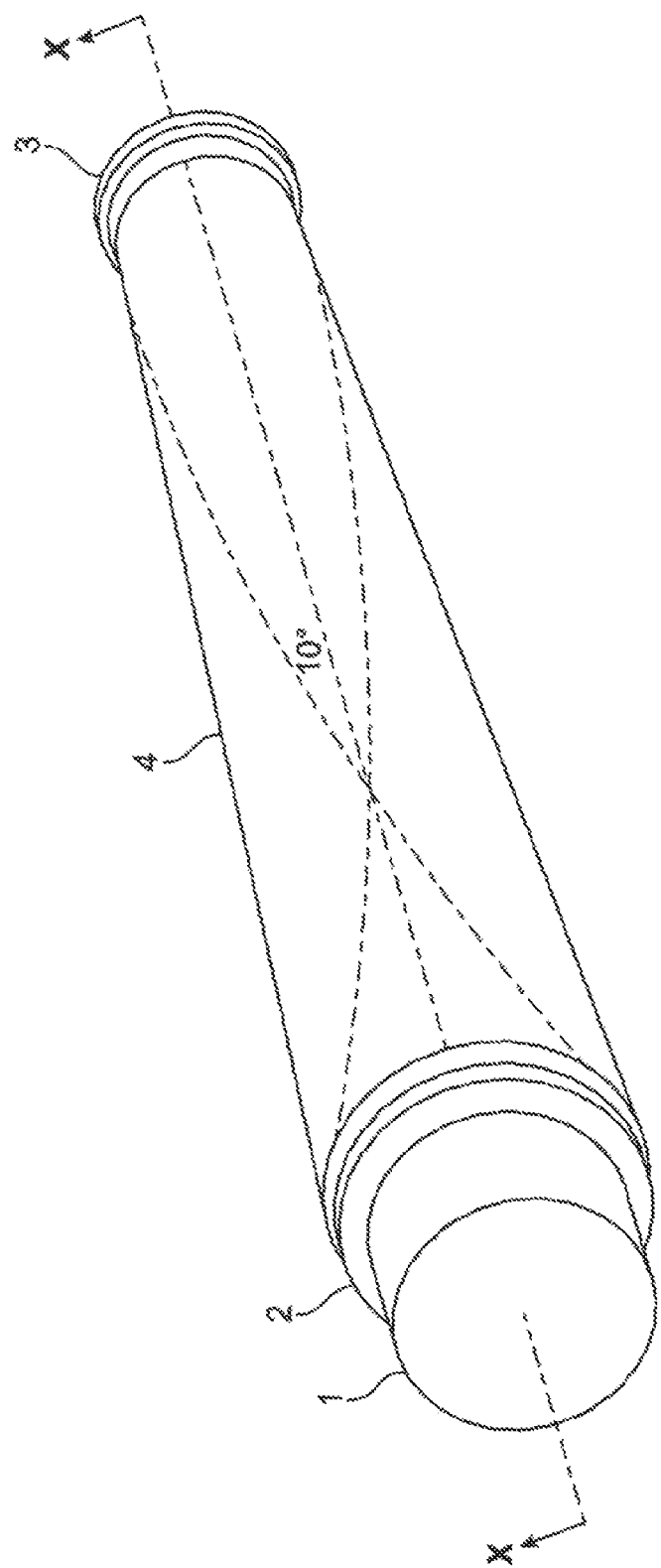
FIG. 1 is a perspective view of a rotatable mandrel on which a flanged support post has been formed in accordance with the invention.

Referring firstly to FIG. 1, an elongate tapered mandrel 1 is shown supporting at its widest end an annular end-forming plate 2 and adjacent its narrowest, free, end a disk shaped end-forming plate 3. Between the annular plate 2 and disk plate 3 is shown a wound structural member in the form of a tapered hollow post 4 shown more clearly with reference to FIG. 2.

Figure 2:
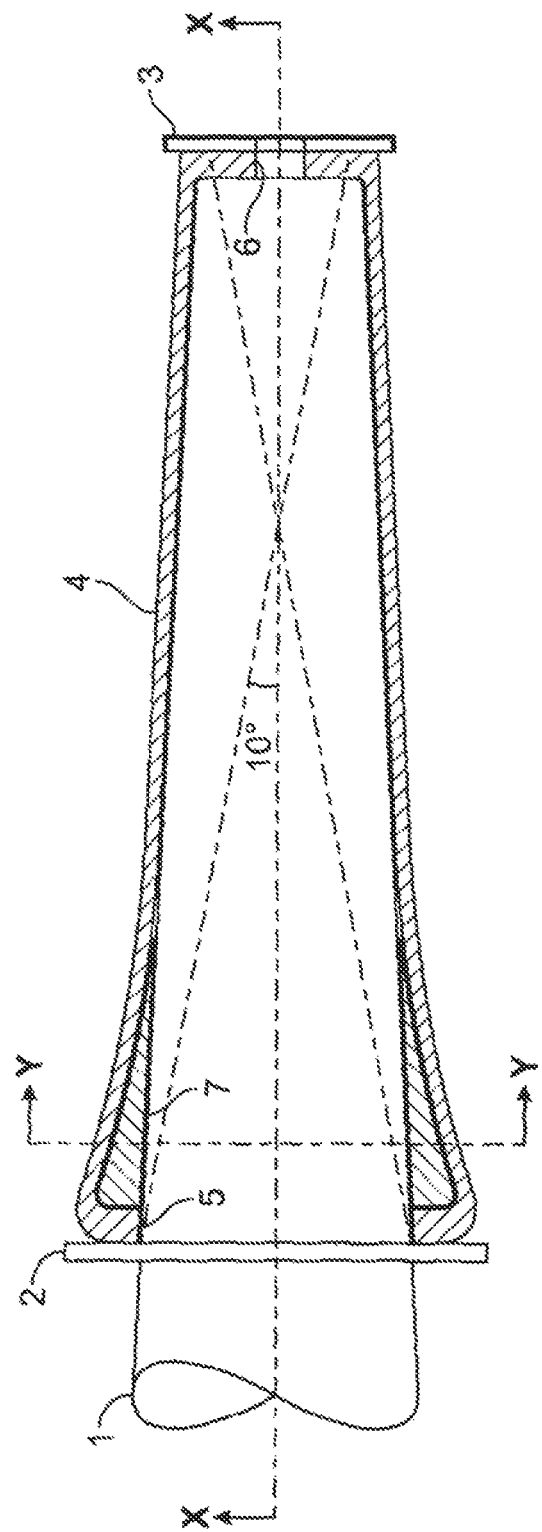
FIG. 2 is a sectional side elevation along the axis X-X of FIG. 1.

In FIG. 2 it will be seen that the post 4 has an inwardly facing flange 5 adjacent the annular plate 2, and another inwardly facing flange 6 adjacent the disk plate 3. The formation of flange 5 is made possible by the provision of a segmented, tapered, annular former 7 placed over and around the mandrel 1 adjacent to but apart from the annular plate 2 so that as the mandrel 1 rotates to form the post 4, filaments from filament winding means (not shown) are able to enter the gap therebetween to form the flange 5. Similarly, the disk 3 is positioned adjacent to, but slightly spaced apart from, the free end of the mandrel 1, thereby allowing the formation of the flange 6 during the winding operation.

Figure 3:
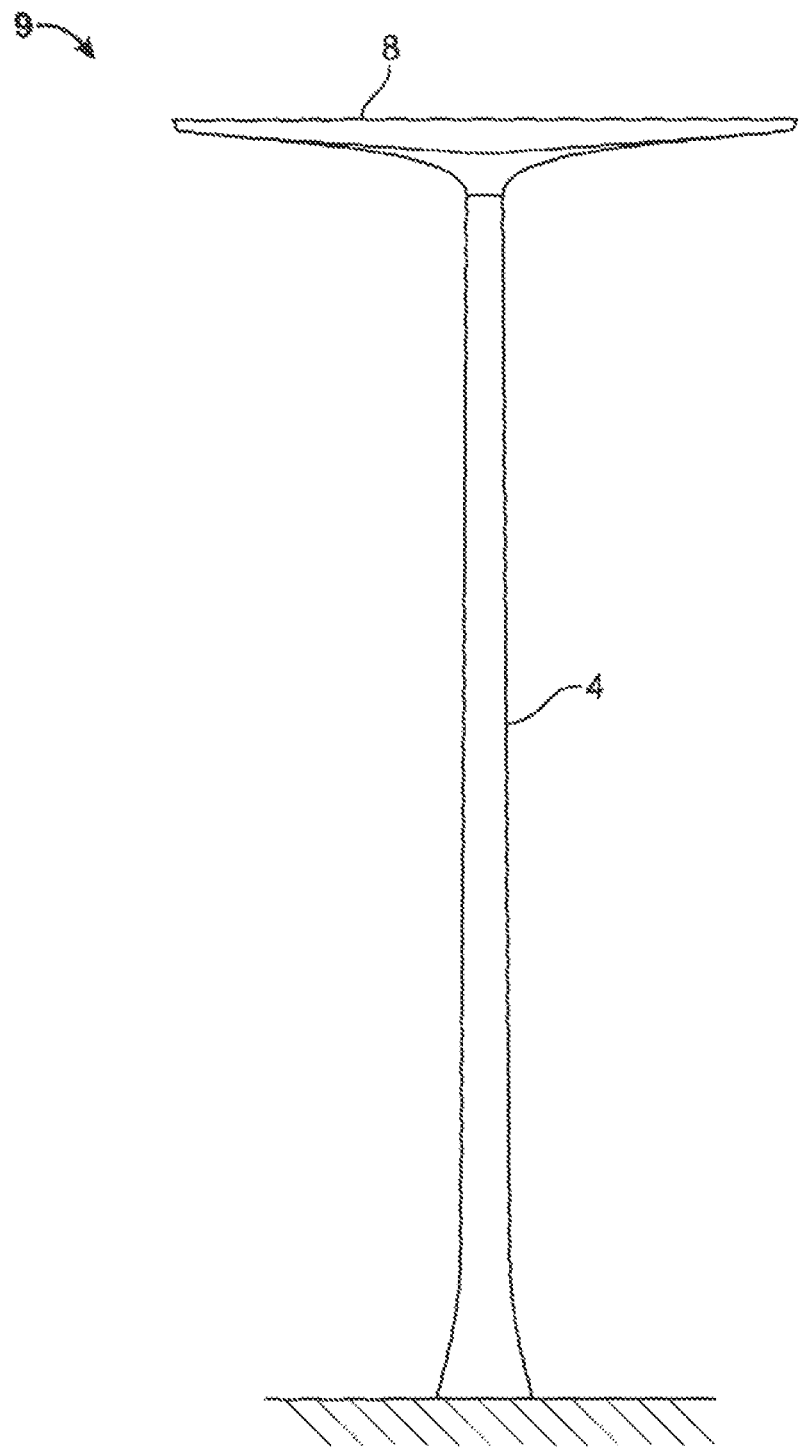
FIG. 3 shows a view of the support post of FIG. 1 in an upright position above the ground forming part of a pylon.

As will be apparent, the formation of the inwardly facing flange 6 does not inhibit removal of the post 4 from the mandrel 1 once the disk plate 3 has been removed, in view of the taper of the mandrel 1. However, the formation of an inwardly facing flange 5 at the other end of the post 4 would ordinarily be problematic in that it would prevent the post from sliding off the mandrel 1. This problem is addressed by the use of the segmented annular former 7 which both permits the formation of a raised portion on the mandrel 1 adjacent to the annular plate 2 to thereafter allow formation of the inwardly facing flange 5, and upon completion of the post 4 including the step of allowing the resin to set the post 4, it can simply be removed from the mandrel, hydraulically or manually, whereafter the former 7 can be removed a segment of time. This arrangement is particularly advantageous because it allows for winding about the central axis of the mandrel 1 at a relatively steep angle, such as 10 degrees from the axis, so that relatively deep flanges 5, 6 can be formed with the filaments making up the post 4 being substantially continuously in tension, thereby maximising the strength of the structural member being formed. In turn, the flanges 5, 6 are large enough to provide the necessary strength for fixing to other elements, such as to the ground in the case of flange 5, and in the case of flange 6, to the support arm 8 of an electricity transmission pylon 9, as shown in FIG. 3. As a consequence, the mechanical properties of the filament used to make up the post 4 can be fully exploited without the need for separate joints to be attached for fixing the post 4 to e.g. a concrete support base in the ground in any suitable manner.

Figure 4:
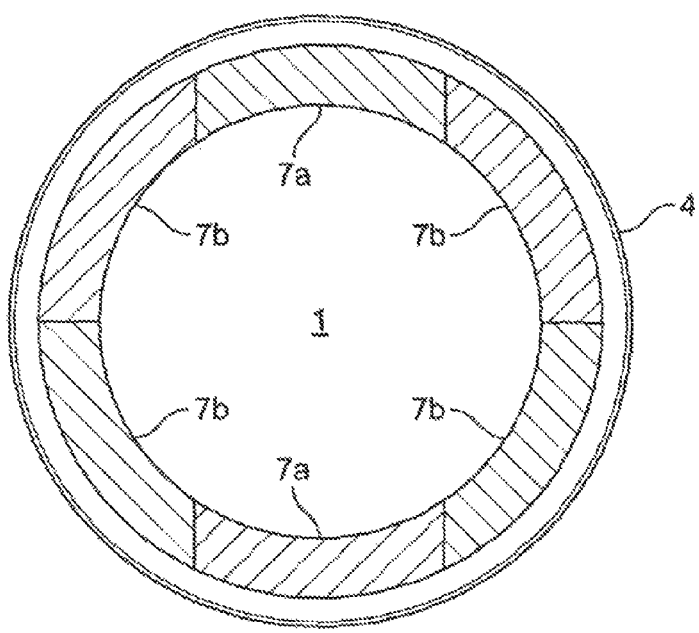
FIG. 4 is a section across the line 'Y-Y' of FIG. 2.

In FIG. 4 there is shown a cross section along the axis 'Y-Y' of FIG. 2 in which it will be seen that the segmented annular former 7 includes two parallel-sided former segments 7a and four quadrant former segments 7b, the segments 7a and 7b collectively defining a trumpet-shaped annulus when mounted on the mandrel 1. As will be apparent, when the post 4 has been removed from the mandrel 1 removal of each parallel-sided segment 7a is facilitated by sliding them radially inwardly, whereafter the quadrant segments 7b can be removed, leaving the post 4 with a flange end in that region.

Figure 5:
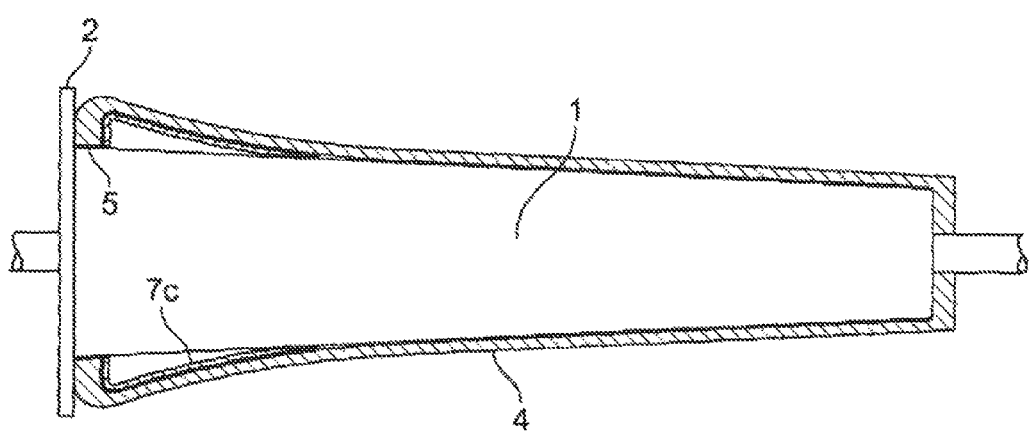
FIG. 5 shows a sectional view of a second embodiment of the invention supported on a mandrel.

An alternative approach is shown in FIG. 5 in which a pre-moulded GRP annular former 7c is used to form the flange in conjunction with the end plate 2, in this case with the intention of leaving the former 7c in position after the post 4 has been wound and set and thereafter removed from the mandrel 1.

The invention therefore provides an elegantly simple solution to the problem of securing such structural members, particularly very long members such as pylons or masts, to anchor points without weakening the structural element as a result of some of the filaments being cut in these regions.

Although the invention has been shown with reference to the manufacture of a structural element in the form of a post, having a pair of inwardly facing flanges at each end, it will be apparent that the concept of utilising removable formers on the outside of the mandrel may also be used to form outwardly facing hollow flanges or formations of varying shapes at positions along the length of the mandrel. Similarly, it will be appreciated that although segmented formers have been described the invention also extends to continuous for which are strong enough to resist undue compression as the structural member is being wound on the mandrel but thereafter resilient enough to allow the former to be released from the inside of the structural member after it has been moved from the mandrel, or to leave the former in situ if preferred.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

The invention claimed is:

1. A method of forming a first flange or formation, on or in a hollow continuously wound structural member, the method comprising the steps of:
    providing a tapered mandrel on which to continuously wind a loop of filament or filaments to form a hollow structural member;
    providing an end-forming plate at an end of the mandrel;
    placing a first former on the outside of the mandrel adjacent to but spaced from the end-forming plate by a required amount to form the first flange or formation when the member has been fully wound and set within a resin, wherein the first flange or formation is inwardly facing at the end of the structural member; and,
    removing the continuously wound structural member from the mandrel.

2. The method according to claim 1, wherein a second flange or formation comprising a shape different than the first flange or formation is formed at an intermediate point along the length of the structural member, the second flange or formation being shaped by the presence of a second former thereunder or thereabout.

3. The method according to claim 1, wherein the first former is removed from the inside of the structural member once the structural member has been removed from the mandrel, by the use of a segmented former allowing each such segment to be removed sequentially.

4. The method according to claim 1, wherein the first former is elastomeric in nature or bendable, strong enough to allow the formation of a flanged or formed region, and pliant enough to be removed from the inside of the structural member upon completion of the fabrication process.

5. The method according to claim 1, in which the first former is left in situ after the structural member has been removed from the mandrel.

* * * * *